United States Patent [19]

Widerby

[11] Patent Number: 4,482,267

[45] Date of Patent: Nov. 13, 1984

[54] APPARATUS FOR MOUNTING A VENTILATION ELEMENT IN A VENTILATION CONDUIT

[75] Inventor: Lennart Widerby, Jonkoping, Sweden

[73] Assignee: Flakt Aktiebolag, Nacka, Sweden

[21] Appl. No.: 461,152

[22] Filed: Jan. 26, 1983

[30] Foreign Application Priority Data

Jan. 29, 1982 [SE] Sweden ................ 8200488

[51] Int. Cl.³ .............................................. F16B 7/22
[52] U.S. Cl. .................................... 403/377; 403/371; 403/24; 98/67; 98/83; 98/122; 220/326; 138/96 R
[58] Field of Search ............. 285/189, 96; 98/108, 98/67, 122, 144, 83; 138/89, 96 R, 96 T; 339/123, 128; 220/324, 326; 403/377, 24, 371

[56] References Cited

U.S. PATENT DOCUMENTS

| | | | |
|---|---|---|---|
| 2,505,147 | 4/1950 | Scallon. | |
| 2,660,106 | 11/1953 | Gray | 98/83 |
| 2,805,616 | 9/1951 | Roth | 98/67 |
| 2,950,937 | 8/1980 | Bedford | 403/372 |
| 2,976,796 | 3/1961 | Anthony et al. | 98/67 |
| 3,028,184 | 4/1962 | Knowlton | 403/283 X |
| 3,236,171 | 2/1966 | Vaskov et al. | 98/114 |
| 4,058,329 | 12/1977 | Johansson. | |
| 4,078,476 | 3/1978 | Widerby. | |
| 4,436,021 | 3/1984 | Hisey | 98/67 |

FOREIGN PATENT DOCUMENTS

| | | |
|---|---|---|
| 780988 | 3/1981 | Finland. |
| 59299 | 3/1981 | Finland. |
| 391384 | 2/1977 | Sweden. |
| 637357 | 5/1949 | United Kingdom. |
| 734857 | 8/1953 | United Kingdom. |

Primary Examiner—Cornelius J. Husar
Assistant Examiner—Joseph A. Fischetti
Attorney, Agent, or Firm—Dann, Dorfman, Herrell and Skillman

[57] ABSTRACT

Apparatus for mounting supply and exhaust air valves or other ventilation elements in ventilation conduits comprising one or several anchor devices which are attached by a base onto the back side of the element. From the base extends a triangular intermediate section. One triangle side borders the base, and a second triangle side borders an outward extending wing with circumferential orientation relative to an opening in which the element is to be fastened. The wing is divided by slots into tongues, and the free ends of the tongues are pointed and bent outward in direction toward the walls of the opening. Different configurations of the anchor devices are shown.

7 Claims, 15 Drawing Figures

APPARATUS FOR MOUNTING A VENTILATION ELEMENT IN A VENTILATION CONDUIT

FIELD OF THE INVENTION

The present invention relates to apparatus for mounting a ventilation element in a conduit and is particularly adapted to provide mounting of an element without the use of separate fasteners or tools.

BACKGROUND OF THE INVENTION

In ventilation systems, the ventilation air is admitted to the room through openings in the wall or ceiling and such openings are fitted with a removable ventilation elements, normally air valves, diffusers or grilles for supplying and exhausting air. The conduits to which the elements are connected may be of varying widths or diameters and may even vary in type. Frequently the conduit is simply an opening in a concrete wall and such conduits are often uneven and include a great number of varying irregularities.

If the conduit embodies a standard piece of duct work or other pre-formed conduit, the ventilation element may be designed to mate with the pre-formed conduit and may be screwed in place or glued by suitable sealing cement. However, where it is desirable to permit ready removal and replacement of the ventilation element, it has been proposed to provide spring latches which releasably mount the ventilation element in the duct. Such devices are normally not suitable unless the ventilation element has a cylindrical portion which telescopically engages in the duct conduit to position the same. In such cases, the latch element may comprise a special expanding member on the cylindrical portion which springs out to engage the conduit and secure it in position.

In order to solve these problems, a mounting arrangement has been provided in which the ventilation element is provided with resilient brackets which may spring outwardly against or behind an irregularity or a shoulder. The resilient element then is designed either to pass "over-center", or to act as a cam element to resiliently cause the ventilation element to bear tightly against the wall surface surrounding the ventilation opening.

The foregoing mounting apparatuses are not entirely satisfactory, because of their complicated construction and assembly, their expense, and their inability to adapt to openings which are quite irregular.

SUMMARY OF THE INVENTION

The present invention provides apparatus for mounting ventilation elements in a ventilation conduit in a simple and effective manner. In accordance with the present invention the mounting operation is fast and the devices used are inexpensive to manufacture and apply. The apparatus of the present invention does not require the ventilation element to telescopically engage with the ventilation opening and accordingly, elements made in accordance with the present invention, are readily used in a wide variety of installation sites.

In accordance with the present invention, the ventilation element which is to be mounted in the ventilation conduit or opening, is provided with at least one anchor device mounted on the side of the element which confronts the opening. The anchor device has a base which is secured to the ventilation element and a wing portion which projects into the conduit or opening, extending circumferentially of the center line of the opening and having a tip at its free end to engage an interior wall of the conduit or opening. The wing is divided into independent tongue portions, each having a tip portion which is displaceable independently of the tip portion of the adjacent tongue.

BRIEF DESCRIPTION OF THE DRAWINGS

The foregoing summary as well as the following detailed operation of the preferred embodiments of the invention will be understood when read in conjunction with the appended drawings in which.

DETAILED DESCRIPTION OF THE INVENTION

Figure 1:
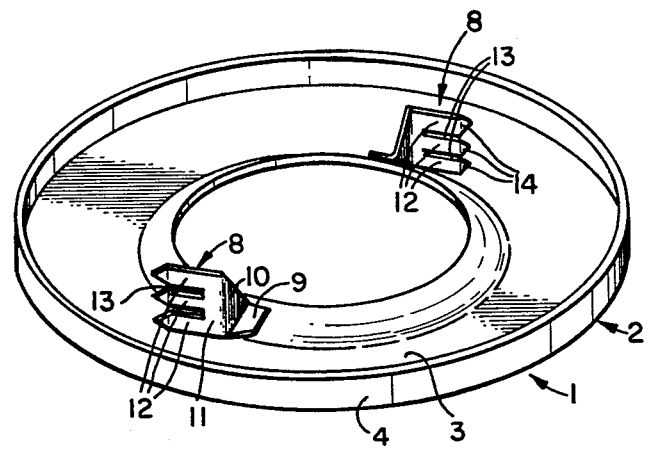
FIG. 1 is a perspective view of a ventilation element in the form of a cover plate showing anchor devices in place on the underside thereof in accordance with the present invention.

With reference to the drawings, the mounting apparatus 1 of the present invention comprises a face plate 2 and a pair of anchor devices 8,8 disposed at diagonally opposite sides of the inside surface of the face plate. The face plate 2 comprises an annular flange 3 having an outer collar 4 which is turned inwardly to bear against the surface 6 of the wall or ceiling which includes the ventilation opening. The inner periphery of the annular flange 4 has a seat portion inclined inwardly which may be convex as shown. Of course, the face plate 2 may be part of a valve or diffuser or ventilation grille or any other ventilation element. The configuration of the ventilation element 2 is not critical. Likewise, the illustrated embodiment of the invention includes two anchor devices 8 disposed at diagonally opposite sides of the seat 5, but it is possible to obtain good effects with a single resilient anchor device which may cooperate with other non-resilient members on the ventilation element to anchor it within an opening. The two-point support provided by the illustrated embodiment has been found effective for square and cylindrical openings. For other openings, it may be preferable to provide a three-point support in which the anchor devices are disposed at spaced points around the circumference of the seat, for example at 120° spacing. In other cases, additional anchor devices may be used, as needed.

Figure 2A:
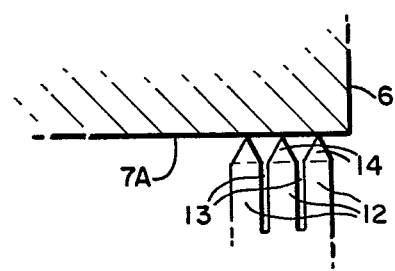
FIGS. 2A through 2D are diagrammatic fragmentary sectional views showing the engagement of the anchor device with conduit or openings having different interior configurations.
Figure 2B:
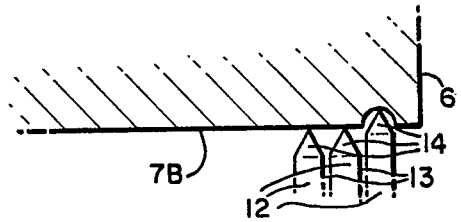
Figure 2C:
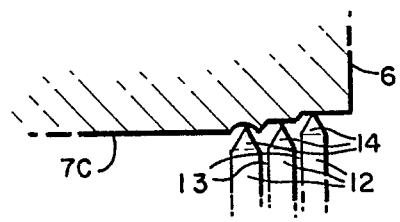
Figure 2D:
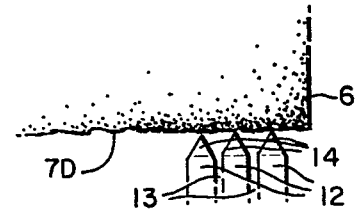
Figure 5:
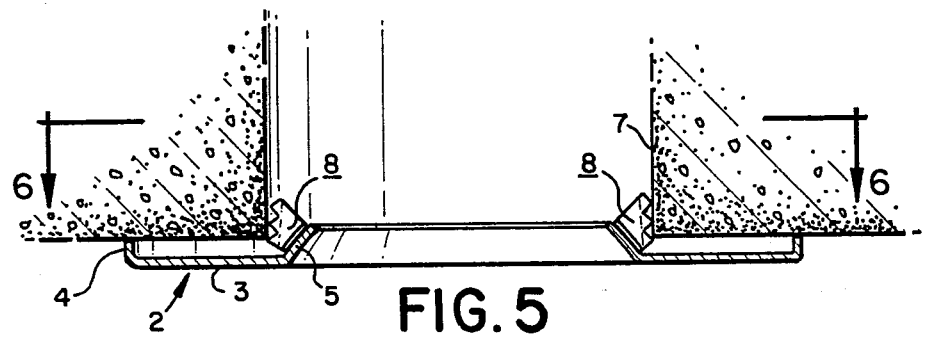
FIG. 5 is a sectional view through a conduit or opening showing a cover plate anchored in place in accordance with the present invention.
Figure 6:
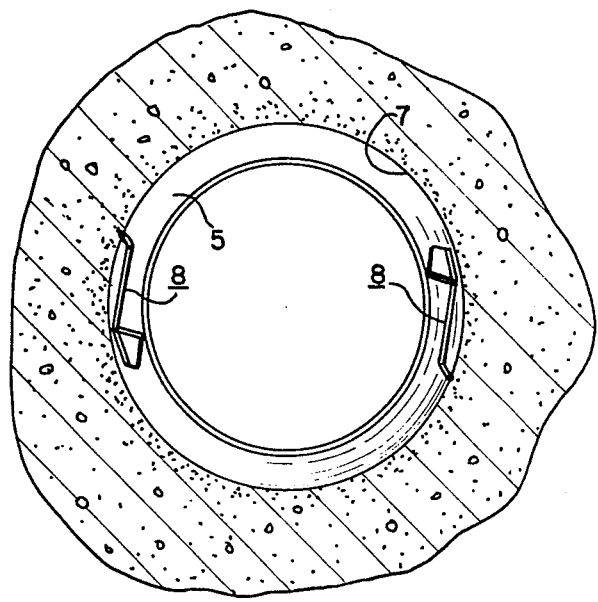
FIG. 6 is a fragmentary sectional view taken on the lines 6—6 of FIG. 5.

The nature of the anchor device is such that it may be welded, riveted, cemented, or otherwise permanently attached to the ventilation element at any desired location, and the mounting of the anchor devices on the ventilation element may be accomplished at the construction site. As shown in FIGS. 5 and 6, the anchor device is designed to engage the interior wall 7 of the ventilation opening. The ventilation opening may be formed by a duct, pipe, or other pre-formed conduit which extends through the wall and terminates flush with the surface 6 of the wall. As shown in FIG. 2A, the interior wall may be smooth and regular as indicated at 7A, or it may have a groove adjacent the wall surface 6 as indicated at 7B in FIG. 2B. The exposed end of the conduit may also be threaded or provided with an irregular contour as shown at 7C in FIG. 2C. Furthermore, the conduit may be formed directly in the concrete surface of the wall as shown at 7D in FIG. 2D, in which case the interior surface of the conduit may be rough and irregular. Thus it is apparent that the mounting apparatus of the present invention is applicable to a wide variety of installations.

Figure 3:
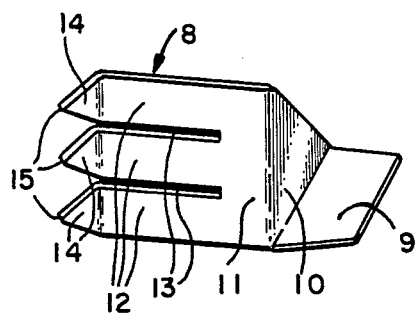
FIG. 3 is a perspective view of the anchor device.
Figure 4:
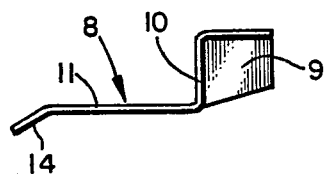
FIG. 4 is a plan view of the anchor device shown in FIG. 3.

The anchor device 8 is formed to provide a resilient mounting support for the ventilation element. To this end, as shown in FIG. 3, the anchor device comprises a base portion 9 which is designed to be attached to the underside of the seat 5 by any suitable means such as welding, riveting, cementing or other permanent attachment means. As shown in FIG. 3, the base is somewhat rectangular and flat, but for different installations it may be modified as set forth more fully hereinafter in order to fit flush against the contour of the surface to which it is applied. Projecting outwardly from the base is an intermediate portion 10. As shown in FIG. 3, the portion 10 is triangular and is disposed at right angles to the base 9. Again the angularity between the intermediate portion 10 and the base 9 may be varied to accommodate to the particular installation. The intermediate portion 10 is triangular in form and is connected to the base along one side of the triangle. An adjacent side of the triangle connects to a wing portion 11 while the third side of the triangle is free and faces towards the central opening of the ventilation element which is defined by the seat 5. This latter side of the triangle and the adjoining side of the base are suitably co-planar in a plane perpendicular to the intermediate section 10. Moreover, in many installations, it is preferred to have the intermediate section and the base enclose a larger angle than 90°, e.g. approximately 120°, as shown in connection with the anchor device 48 in FIGS. 10–12.

The wing portion 11 of the anchor device 8 is generally rectangular in outline and is divided into parallel tongues 12 by means of slots 13 extending parallel to the top and bottom edges from the free end. As shown, the slots 13 terminate short of the junction with the intermediate section 10 so as to enable the three tongues to move together by flexing of the wing portion 11 about the junction line with the intermediate portion 10. However, the length of the slots 13 is sufficient to permit the individual tongues to move relative to one another. The free ends of the tongues 12 are formed with tips 14 which are bent out at a suitable angle, preferably between 30° and 60° in a direction away from the seat 5 and terminate in points 15. The tips 14 are coplanar in a plane which may be greater than 90° from the plane of the base 9, for example 120°.

The configuration of the anchor device 8 is such that when it is installed as shown in FIG. 5, the junction line between the wing 11 and the intermediate section 10 is parallel to the center line of the opening defined by the walls 7, or is preferably slightly inclined to the center line so that the outermost tongue is normally positioned closer to the center line of the opening than is the tongue adjacent the base 9. In this way, the wing 10 is inclined inwardly toward the axis of the opening so that the ventilation element with the anchor devices thereon may readily be inserted into the opening defined by the walls 7. After insertion, the ventilation element 2 may be rotated about the axis in the direction so that the junction lines between the wings 11 and intermediate portions 10 are leading relative to the tip portions 14 of the wings. Thus the wings 11 and 11 on the opposite side of the ventilation element 3 generally converge inwardly of the outlet opening, facilitating insertion of the anchor devices 8 into the opening. When rotated clockwise in FIG. 6 the resiliency of the wings and the angular orientation of the tips 14 enables the tips to ride inwardly easily as the ventilation element is rotated. Likewise, the ventilation element may be withdrawn from the opening by rotating it clockwise and pulling it outwardly as it rotates. The inclination of the wings 11 is such that the tongue 12 which is innermost in the opening is 5 to 10 millimeters closer to the axis of the opening than the tongue 12 which is adjacent the seat. The circumferential disposition of the tongues 13 permits deflection of the tongues and the wing without causing deflection of the triangular intermediate portion 10. As shown in FIGS. 2A through 2D, the separation of the tongues permits the tips to conform to various different irregularities in the inside surface of the opening. To facilitate engagement of the points 15 in the various configurations of the interior sidewall 7. The points 15 are sufficiently acute so that they may firmly engage in the smallest irregularity.

The anchor device according to the present invention is easily produced of spring metal through simple stamping and bending operations. Furthermore, mounting of the anchor device on the ventilation element is simple and should not present any problem. The design of the anchor device can vary according to need and the configuration may be individually adapted to the particular situation of the installation. For example different embodiments are shown in FIGS. 9 through 12. In this way, different characteristics may be chosen and controlled. The length of the slot determines the individual deformability of each tongue and the angular relationship between the intermediate portion 10 and the base 9 and the wing 11 respectively determines the orientation of the tips 14 relative to the base 9, and these angles may be varied to accommodate different configurations of ventilation elements.

Figure 7:
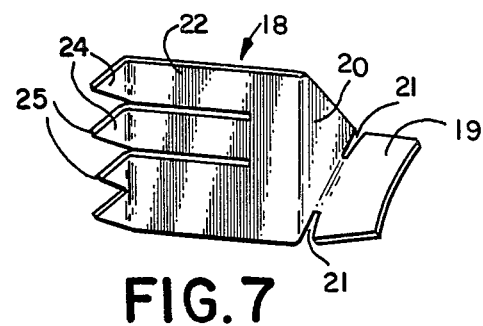
FIGS. 7, 8, 9 and 10 are views similar to FIG. 3 showing different forms of anchor devices embodying the present invention.

In FIG. 7 an anchor device 18 is provided which has three tongues 22, two of which are of a width corresponding to the width of the tongues 12 and one of which is of double width. The tip 24 of the narrow tongues has a single point 25 centered to form an equilateral triangle of the tip 24 whereas the double-width tongue has a tip with double points. To faciliate conforming the base 19 of this anchor device to the configuration of the seat to which it is secured, slits or gores 21 are provided along the junction line between the base 19 and the intermediate portion 20.

Figure 8:
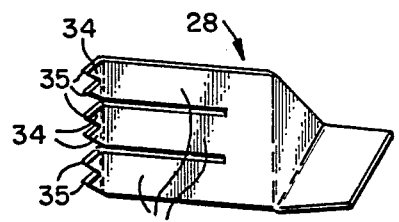

FIG. 8 illustrates an anchor device 28 having tongues 32 with tips 34 provided with double points 35.

Figure 9:
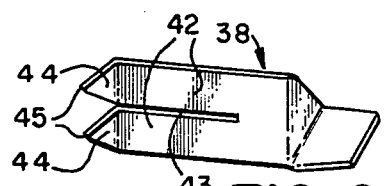

In FIG. 9 an anchor device 38 has its wing provided with a single slot 43 to provide a pair of tongues 42, 42. The tips 44 of the tongues are in the form of right triangles so that the point 45 of the tip 44 is co-planar with the lower edge of the tongue.

Figure 11:
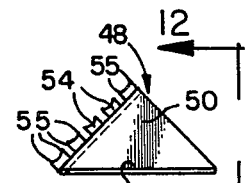
FIG. 11 is a reduced end view of the device shown in FIG. 10.
Figure 12:
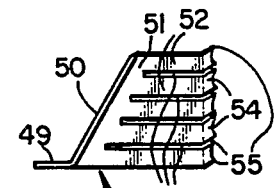
FIG. 12 is a rear view as seen from the lines 12—12 of FIG. 11.
Figure 10:
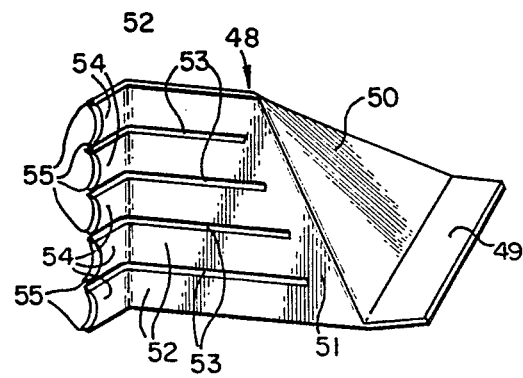

FIG. 10 illustrates an anchor device 48 having five tongues 52. In this case the tip 54 of each tongue is crescent shaped to provide a pair of points 55 on each tongue. In addition, as best shown in FIGS. 11 and 12, the dihedral angle between the intermediate portion 50 and the base 49 is 120° rather than 90° and the wing portion 51 is trapezoidal in outline rather than rectangular. The trapezoidal outline of the wing 51 permits the slots 53 to vary in length providing increasing resiliency to the tongues as they are positioned closer to the plane of the base 49.

From the foregoing, it is apparent that the present invention enables one to choose and vary the angles of the parts of the anchor device to accommodate the anchor device to any sort of ventilation element and to different characters of openings. The illustrated variations are not exhaustive, and one may readily design other configurations to adapt the anchor devices to a particular installation.

While particular embodiments of the present invention have been herein illustrated and described. It is not intended to limit the invention to such disclosures, but changes and modifications may be made therein and thereto within the scope of the following claims.

I claim:

1. For mounting a ventilation element in the opening of a ventilation conduit in a wall surface, said ventilating element having a face plate adapted to confront the wall surface and an annular seat portion engageable in said opening, at least one anchor device having a base mounted on said element within the conduit, and a resilient wing diposed circumferentially of said annular portion substantially perpendicular to the face plate within said conduit and projecting from said base at one end and engaging the interior wall of said conduit at the other end, the other end portion of the wing comprising a plurality of tongues extending circumferentially generally parallel to the interior wall of said conduit, said tongues having at their free ends pointed tips angled outwardly to project substantially radially in relation to the centerline of said conduit so as to engage said interior wall.

2. A device according to claim 1, including means to permanently attach said base to said element, the base being flush with or following the contour of the area of the said element to which said base is mounted.

3. A device according to claim 1, wherein said annular seat portion converges inwardly within said opening, and said base is mounted on said seat portion, said device including a triangular intermediate section between said base and said wing, one edge of said triangle bordering said base, another edge bordering said wing, and the remaining edge being free and situated within the same plane as the adjacent free edge of said base.

4. A device according to claim 3, wherein the edge of the intermediate part which borders the wing is at an angle to the base so that it is inclined to center axis of the conduit opening and the entire wing is inclined towards said axis.

5. A device according to claim 1, wherein the intermediate section and the base include an angle approximately 120°.

6. A device according to claim 1, wherein the tongues are separated by slots which extend from the free end of the wing towards the base area and terminate short of the end of the wing which is connected to said base.

7. A ventilation element comprising a plurality of anchor devices according to claim 1, circumferentially spaced about the periphery of said conduit opening, the wings of said devices being turned in the same circumferential direction for making possible pushing or screwing in or out of the element, the tips of the wings being situated further away from the center axis of the opening than the base ends of the wings for facilitating insertion of the fasteners into the opening without substantial elastic deformation or deflection of the anchor devices other than the tongues.

* * * * *